United States Patent
Cote et al.

(10) Patent No.: US 7,564,360 B2
(45) Date of Patent: Jul. 21, 2009

(54) RF RELEASE MECHANISM FOR HARD TAG

(75) Inventors: Andre Cote, Williamstown, NJ (US); Farrokh Abadi, Villanova, PA (US)

(73) Assignee: Checkpoint Systems, Inc., Thorofare, NJ (US)

( * ) Notice: Subject to any disclaimer, the term of this patent is extended or adjusted under 35 U.S.C. 154(b) by 332 days.

(21) Appl. No.: 11/679,250

(22) Filed: Feb. 27, 2007

(65) Prior Publication Data

US 2007/0205902 A1    Sep. 6, 2007

Related U.S. Application Data

(60) Provisional application No. 60/778,646, filed on Mar. 3, 2006.

(51) Int. Cl.
*G08B 13/14* (2006.01)
(52) U.S. Cl. ............... 340/572.9; 340/572.8; 340/572.1
(58) Field of Classification Search .............. 340/572.9, 340/572.8, 572.5, 572.1, 568.1, 571, 539.1, 340/539.13, 10.1, 10.3; 320/101, 124; 455/343.1, 455/572
See application file for complete search history.

(56) References Cited

U.S. PATENT DOCUMENTS

| | | | |
|---|---|---|---|
| 4,567,473 A | 1/1986 | Lichtblau | |
| 4,658,264 A | 4/1987 | Baker | |
| 4,835,524 A | 5/1989 | Lamond et al. | |
| 5,108,822 A | 4/1992 | Imaichi et al. | |
| 5,172,461 A | 12/1992 | Pichl | |
| 6,856,291 B2 | 2/2005 | Mickle et al. | |
| 6,882,128 B1* | 4/2005 | Rahmel et al. | ............... 320/101 |
| 7,183,917 B2* | 2/2007 | Piccoli et al. | ............. 340/572.1 |
| 7,268,517 B2* | 9/2007 | Rahmel et al. | ............... 320/101 |
| 2004/0053584 A1 | 3/2004 | Mickle et al. | |
| 2004/0100385 A1 | 5/2004 | Hansen et al. | |
| 2005/0104553 A1 | 5/2005 | Mickle et al. | |
| 2007/0131005 A1* | 6/2007 | Clare | .......................... 70/256 |
| 2007/0296545 A1* | 12/2007 | Clare | ........................ 340/5.64 |

FOREIGN PATENT DOCUMENTS

NL    EP 0329229 A1    9/2007

* cited by examiner

*Primary Examiner*—Van T. Trieu
(74) *Attorney, Agent, or Firm*—Caesar, Rivise, Bernstein, Cohen & Pokotilow, Ltd.

(57) ABSTRACT

A releasable security tag for attachment to an article of merchandise includes: a locking mechanism with a release for attaching the tag to the article of merchandise; an EAS resonant circuit or an RFID circuit for responding to a first RF signal at a predetermined frequency corresponding to the resonant circuit or to the RFID circuit; an ambient RF energy harvesting circuit; a release signal detection circuit coupled to and powered by the ambient RF energy harvesting circuit and an electro-mechanical actuator electrically coupled to the release signal detection circuit. The electro-mechanical actuator releases the locking mechanism whenever the release signal detection circuit receives a release signal.

53 Claims, 6 Drawing Sheets

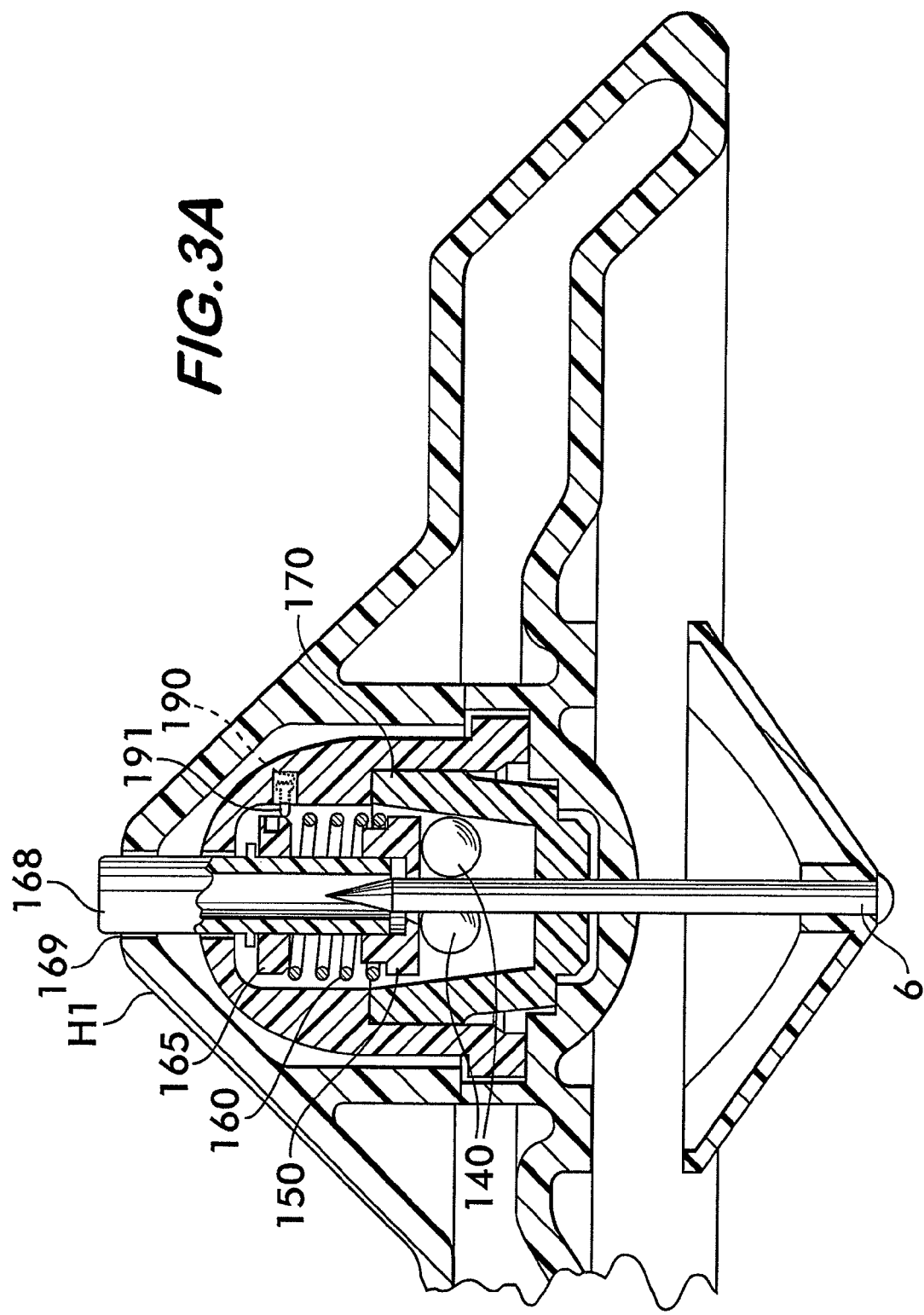

RF RELEASE MECHANISM FOR HARD TAG

CROSS-REFERENCE TO RELATED APPLICATIONS

This utility application claims the benefit under 35 U.S.C. §119(e) of Provisional Application Ser. No. 60/778,646 filed on Mar. 3, 2006 entitled RF POWERED RELEASE MECHANISM FOR HARD TAG the entire disclosure of which is incorporated by reference herein.

BACKGROUND OF THE INVENTION

1. Field of Invention

The current invention relates to security tags and more particularly, discloses a security tag that can be removed from an article to which it is attached by transmission of a wireless (e.g., radio frequency) signal to the tag.

2. Description of Related Art

Electronic article surveillance (EAS) security tags, typically comprise a resonant circuit that utilizes at least one coil and at least one capacitor that operate to resonate when exposed to a predetermined electromagnetic field (e.g., 8.2 MHz) to which the EAS tag is exposed. Scanning equipment transmits a signal at the frequency of the tag and detects the signal created by the resonant circuit. Such tags are applied to merchandise to prevent theft and for inventorying. Various different resonant tag products are commercially available and described in issued patents, for example, U.S. Pat. Nos. 5,172,461; 5,108,822; 4,835,524; 4,658,264; and 4,567,473 all describe and disclose electrical surveillance tag structures.

One form of EAS tag is known as a "hard tag." A hard tag is typically a reusable device that contains the resonant circuitry and that can be attached to an article with means for keeping the tag attached until released by a special apparatus. By way of example only, the coil and the capacitor are enclosed in a first device having a retaining device to accept a pin. A second device containing a pin and looking like a large thumb tack can be inserted through an article of clothing, for example, and into the retaining device of the first device. In an exemplary design the pin is retained by a ball clutch in the tag that prevents removal once the pin is inserted. In this manner, the hard tag is affixed to an article and remains attached such that it cannot be removed by a customer. In typical prior art hard tags having a ball clutch, pressure is applied to the balls by an iron slug backed by a spring. Upon application of a large magnetic field at a point of sale, the slug retracts, relieving pressure from the ball clutch, allowing the pin to be removed by store personnel.

Another type of RF security device is an RFID device. Such a device contains active circuitry to produce an encoded RF signal when energized by an external RF signal. Circuitry for an RFID device can also be contained in a hard tag as described above.

One problem with magnetically-releasable hard tags is that thieves sometimes carry magnets strong enough to remove the tags. Another problem is that of untrustworthy store personnel, who remove the tags for an accomplice customer, without the customer ever paying for the item. Thus, there exists a need for an EAS or RFID hard tag with a more secure removal mechanism.

The present invention is a hard tag powered by harvesting ambient radio frequency energy with circuitry that allows removal only upon application of an encoded RF signal at the appropriate frequency. Such a device prevents thieves from removing the hard tags, and, when linked to a system which tracks an article identification number for each time the RF signal is applied to allow release of a hard tag, can be used to track removal of tags by store personnel.

All references cited herein are incorporated herein by reference in their entireties.

BRIEF SUMMARY OF THE INVENTION

A security tag or other device for affixing to an object is disclosed, wherein the tag can only be removed by activation of a release mechanism that is triggered by an external radio frequency signal, where the device is powered by harvesting ambient radio frequency energy.

One embodiment of such a tag includes a ball clutch for receiving a pin, which is inserted through an article to be tracked by the tag. The ball clutch is held in a locked position by spring pressure. A releasing mechanism, such as a low power solenoid, is activated by an external RF signal. The release circuitry within the tag can be supplied by a current source that receives power from external ambient RF energy. If the tag is an EAS tag, the tag can include a resonant circuit that produces a signal that allows detection of the tag when in the presence of a sufficiently large RF field at the frequency to which the resonant circuit is tuned. If the tag is an RFID tag, it may include a transmitter to send a unique signal when the tag is in the presence of an RF interrogation field at a particular frequency. The receiving and transmitting circuitry of the RFID part of the tag can be self-powered by the RF interrogation signal, or can be powered by the RF energy harvesting circuitry.

The basic elements of an exemplary RF releasable security tag are: 1) an energy harvesting circuit that is powered by external ambient RF energy; 2) an energy storage element for storing power from the energy harvesting circuit; 3) Detection circuitry for receiving a release signal; 5) a switch for applying power to a solenoid from the energy storage element and 6) a solenoid for releasing a security tag attachment element.

BRIEF DESCRIPTION OF SEVERAL VIEWS OF THE DRAWINGS

The invention will be described in conjunction with the following drawings in which like reference numerals designate like elements and wherein:

FIG. 3a is a detail drawing of an exemplary RF releasable hard tag mechanism in an unlocked (released) position;

DETAILED DESCRIPTION OF THE INVENTION

Figure 1:
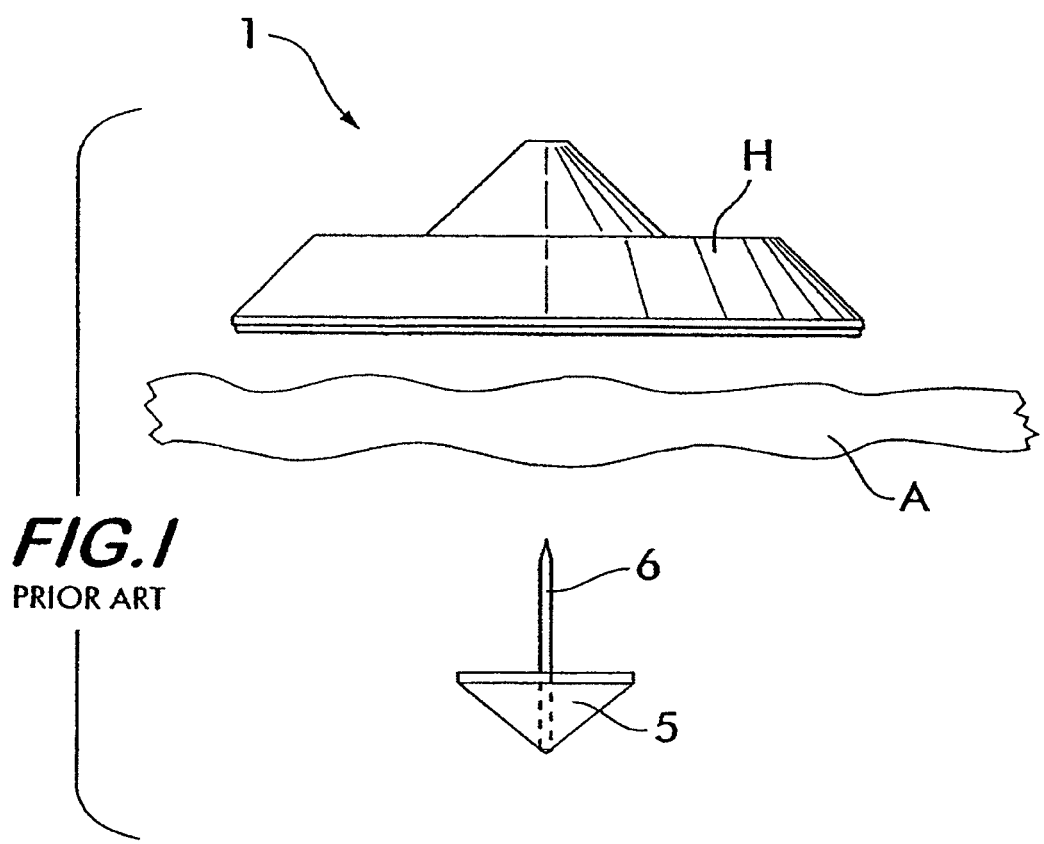
FIG. 1 is a drawing of an exemplary prior art hard tag system.
Figure 2:
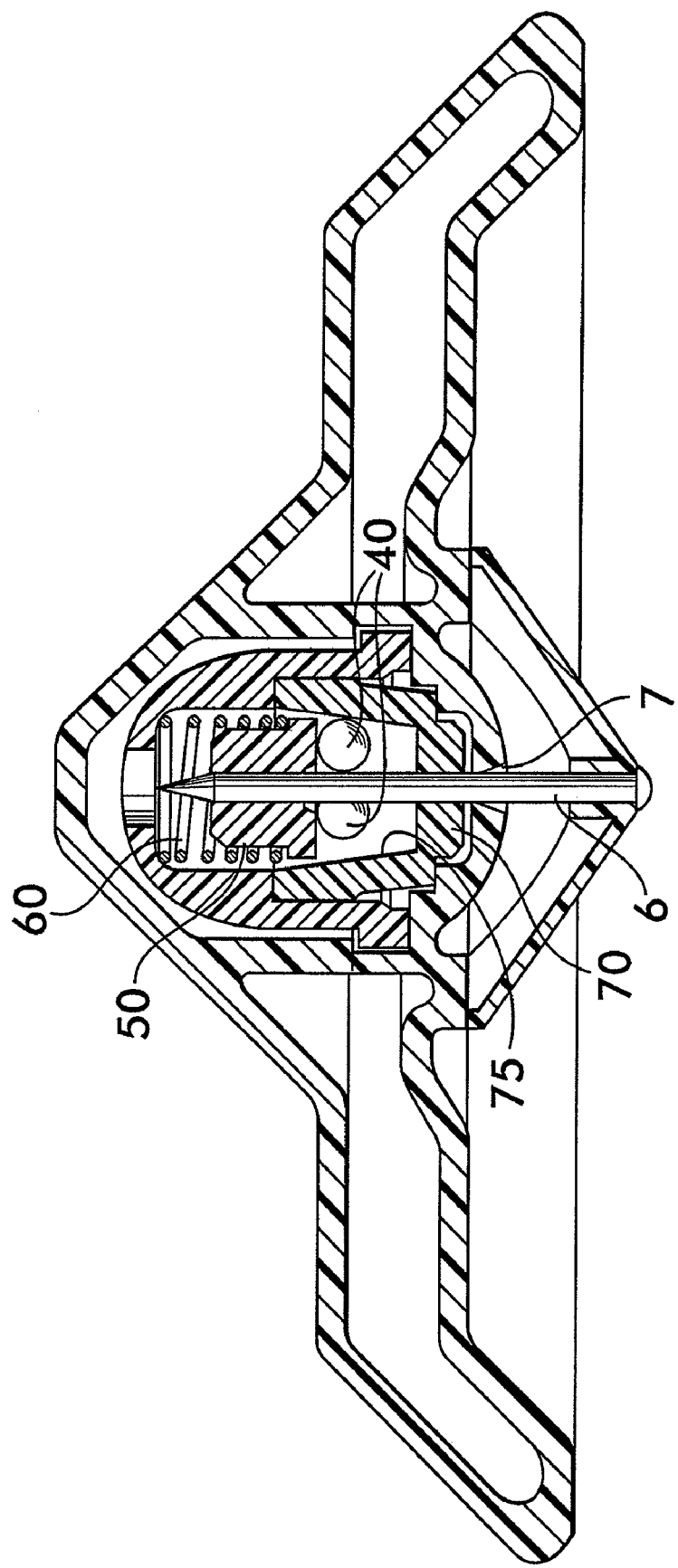
FIG. 2 is a drawing of the locking mechanism of a prior art hard tag shown in an unlocked position.

With reference to FIG. 1, a typical prior art hard tag system includes an electronics housing H and a locking pin assembly 5, the pin 6 of which is inserted thorough an article of clothing A. FIG. 2 is a cross section drawing of a prior art hard tag and locking pin assembly. Pin 6 is inserted into opening 7 in the housing. A plurality of balls 40 are arranged in ball housing 70 such that there is space in the middle of the balls for pin 6 to be inserted between them. The inside walls 75 of ball housing 70 are tapered slightly such that the inside diameter of the housing is smaller at opening end 7 than at the opposite end. Plunger 50 is urged toward the opening end of the ball housing by spring 60, forcing the balls 40 toward the inserted pin 6. The size of the balls and the dimensions of the ball housing are such that the balls tightly grip the pin when they are forced toward the opening by the plunger and spring, and also that the balls do not grip the pin when the plunger is pulled away from the opening end, for example, by a magnet. With the plunger and spring in the extended position (no magnet present) any effort to remove the pin forces the balls tighter against the pin as they are pulled into the narrower end of the ball housing. When the plunger is pulled upward, away from the ball housing opening, the balls rest loosely in the ball housing and the pin can be removed with little effort.

Mechanical Components of an Exemplary RF Releasable Hard Tag

Figure 3:
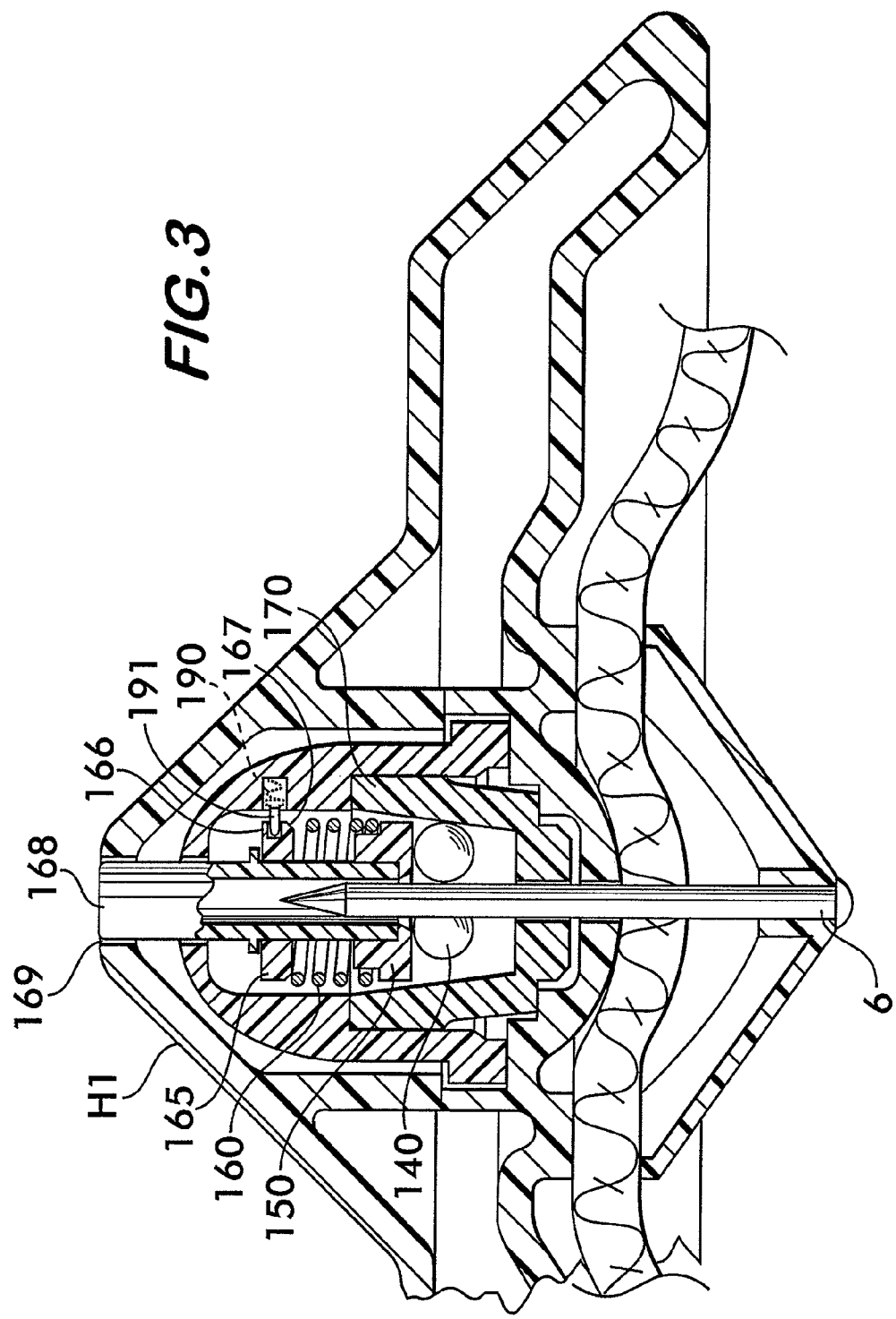
FIG. 3 is a detail drawing of an exemplary RF releasable hard tag release mechanism in a locked position.

FIG. 3 is a cross section drawing of the lock mechanism of an exemplary RF powered releasable hard tag. The tag includes electronics housing H1, which includes ball housing 170, housing locking balls 140. The locking balls are in contact with plunger base 150. Plunger base 150 is in contact with spring 160. Behind spring 160 is plunger plate 165, having a detent 166. Activating plunger 168 passes through an opening 169 in the electronics housing H1. FIG. 3 shows the hard tag in a locked position. In the locked position, plunger plate 166 is locked into position by a spring loaded pin 191 of solenoid 190 which is engaged into detent 166 in plunger plate 165. Chamfer 167 in the plunger plate 165 allows the plate to be pushed down while forcing the solenoid pin 191 into the detent once the plate 165 is pushed sufficiently far to allow it to be locked in place by the solenoid pin 191. In the locked position, plunger plate 165 places spring 160 in a compressed state, such that a force is applied to plunger base 150, urging balls 140 toward the narrow end of ball housing 170. With the balls in the narrow end of the ball housing 170, the pin 6 is held captive against any retraction force. With the tag in a locked position, the pin 6 can be inserted into the tag because an upward force against the balls pushed them to the wider end of the ball housing leaving room for the pin 6 to be inserted. One skilled in the art will readily appreciate the size of spring 160 necessary to hold plunger base 150 against the balls 140 with sufficient force to prevent retraction of the pin, while not presenting so much force as to make insertion of the pin difficult. The size of spring 160 must also be compatible with the amount of energy available from the RF harvesting circuitry to retract solenoid pin 191.

FIG. 3A shows the RF releasable tag in an unlocked position. In the unlocked position, plunger plate 165 is not engaged by solenoid pin 166 and is at the far end of the electronics housing H1 from the balls 140. In this position, spring 160 is completely relaxed, such that it does not apply any force on plunger base 150, releasing balls 140 from the narrow end of the ball housing 140 so that the pin 6 can be removed. To return the tag to a locked position, an external force is applied to plunger 168 until plunger plate 165 is forced far enough toward the spring that detent 166 is opposite solenoid pin 190. Solenoid pin 190 is spring-loaded such that the solenoid pin 190 moves into the detent when the plunger plate 165 is pushed in, thus locking the plunger plate 165 in a position forcing spring 150 in a compressed state.

Electronic Components

Figure 4:
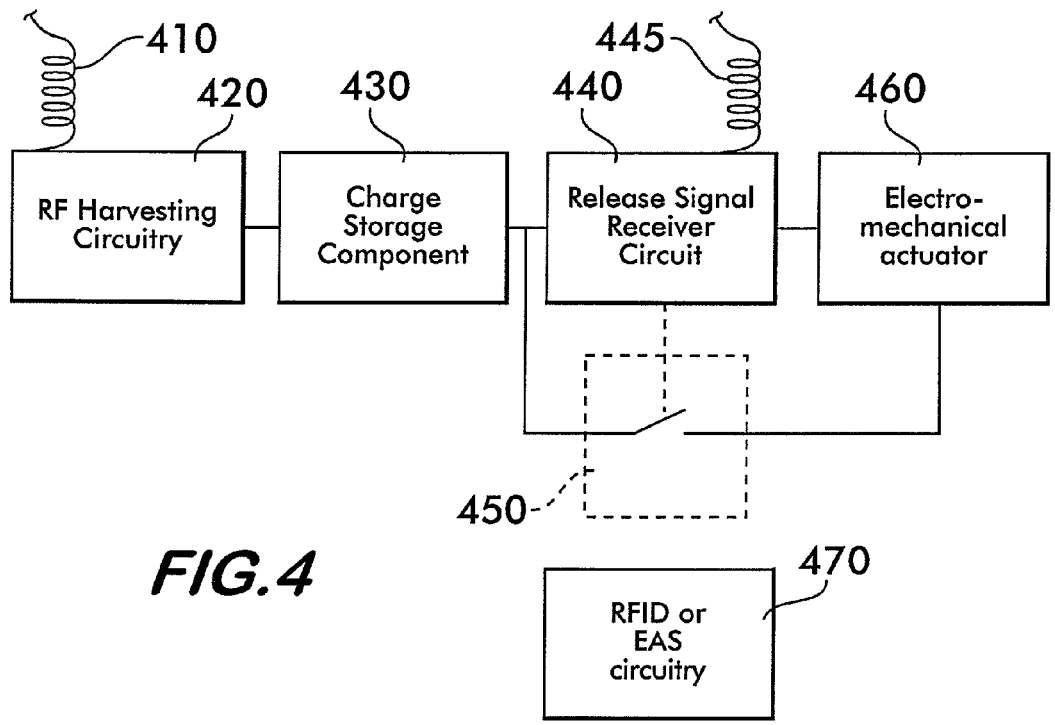
FIG. 4 is a block diagram of the electronics for an exemplary RF releasable hard tag.

With reference to the block diagram in FIG. 4, the basic electronic elements of an exemplary RF releasable security tag are: an antenna for receiving ambient RF energy 410; RF harvesting circuitry 420 for converting the received ambient RF energy to a direct current signal; a charge storage component 430; release signal receiving circuitry 440, which may have an antenna 445; an electro-mechanical release mechanism 460, (e.g. solenoid 190) and an electronic switch 450 for supplying power to the electro-mechanical release mechanism. Electronic circuitry (e.g. RFID or EAS circuitry) 470 for providing tag detection response can be electrically separate and apart from those described above for the hard tag release. Such components that are well known in the art can include EAS passive resonant circuits incorporating an inductor/antenna and a capacitor. RFID circuits that are powered by an external RF signal and produce a coded RF signal are also well known and can be housed in the hard tag.

RF harvesting circuits that supply DC power from ambient RF energy are well known in the art. For example, U.S. Patent Application Publication US 2005/0104553, Mickle et al., whose entire disclosure is incorporated by reference herein, discloses a means for receipt of ambient RF energy to energize power storage elements for powering wireless devices. This publication discloses the reception and conversion of a wide band of ambient radio frequency energy into direct current. Another approach harvests RF energy from a single frequency source, which may be transmitted in the vicinity of the device or devices to be powered from that energy. U.S. Pat. No. 6,856,291, (Mickle et al.), and U.S. Patent Application Publication No. US 2004/0053584, (Mickle et al.), both disclose charging apparatuses based on reception of limited bandwidth RF energy, and both of whose entire disclosures are incorporated by reference herein.

In an exemplary embodiment, RF harvesting circuitry 420 powers a charge storage element 430 which can be a large value storage capacitor with low leakage or a rechargeable battery. The storage element supplies DC power to release signal receiver circuitry 440, which can be an RF receiver tuned to a particular frequency, with an antenna 445 for receiving the release signal. Upon receipt of a signal at that frequency, the receiver circuit activates electronic switch 450, which connects power from the storage element 430 to the electro-mechanical release mechanism 460. In an exemplary design, the receiver 440 is a low power integrated circuit and the electronic switch 450 is a MOSFET or other type of semiconductor switch with a low voltage drop.

In another embodiment, the release circuitry can be more sophisticated than the simple reception of an RF signal at a single frequency. In this embodiment, the release is conditioned on reception of a code broadcast at an RF carrier frequency by any of various known means of modulation. The use of a code to trigger tag release reduces the chances of inadvertent release of a tag and enhances the user's ability to track removal of tags from merchandise. For example, a tag requiring reception of a unique identification code before release can be associated with piece of inventory. A transmitter for sending a release signal can be connected to a cash register system and product identification hardware, such that the unique release code associated with the piece of inventory is only transmitted when a valid sale transaction is recorded for the identified piece of inventory. Such a system would allow, for instance, customers to remove tags on their own after they have paid for items at self-service checkout stations by sending the release signal once the product has been identified and paid for. This type of system would also prevent employee theft whereby employees remove tags from merchandise for illegitimate "customers" without the accomplice paying for the item.

Figure 6:
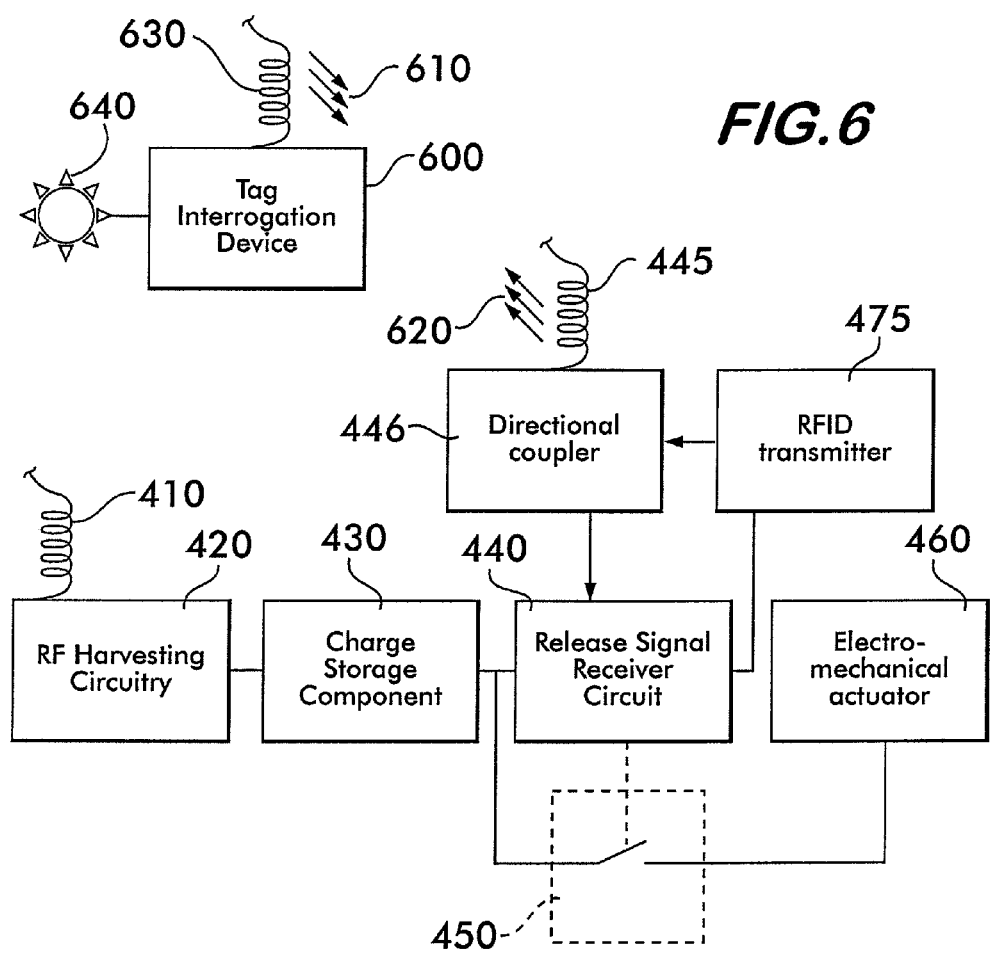
FIG. 6 is a block diagram of the electronics for an exemplary RF releasable hard tag system.

In another exemplary version of the RF releasable tag (either EAS or RFID), the release signal receiver 440 can also be used as a means for receiving a tag interrogation signal. With reference to FIG. 6, detection device 600 transmits an RF interrogation signal 610 through antenna 630. Typically the detection device, or at least antenna 630 is placed at a store exit point to detect tagged items that are being removed from the store. The RF interrogation signal is tuned to the same frequency used to release the hard tag. The interrogation signal is received by receiver 440. Reception of the signal can be through antenna 445. Upon reception of the interrogation signal, receiver 440 activates RFID transmitter 475, which sends an RF signal 620, preferably modulated with a code identifying the tag. The detection device 600 receives the RFID signal and activates an alert device 640. If the receiver 440 and the RFID transmitter 475 operate at similar frequencies, then the same antenna 445 can be used for both devices. A directional coupler 446 is used to ensure that signals received by the antenna 445 only go to the receiver 440 and signals transmitted by the RFID transmitter 475 only go out the antenna 445 and are not fed back into the receiver 440. This signal 620 sent by the RFID transmitter 475 is received by the detection device 600, which then causes an alert 640 that the tag was detected. In this embodiment, the RFID transmitter is powered from the charge storage device 430, which is charged by the RF harvesting circuitry 420. As long as the RF release circuitry 440 requires reception of a code, which is not sent with the tag interrogation signal 610, then there is no risk that the interrogation signal 610 will trigger the release circuitry 440 and mechanism. The response from the RFID transmitter 475 can either be a generic signal identifying a tag's presence, or can be modulated with a code associated with each individual tag. It is advantageous that the tag responds to an interrogation with a unique identifier code as this allows for the tag to be affirmatively identified at a point of sale before a release signal is sent to the tag.

FURTHER EMBODIMENTS

Figure 5:
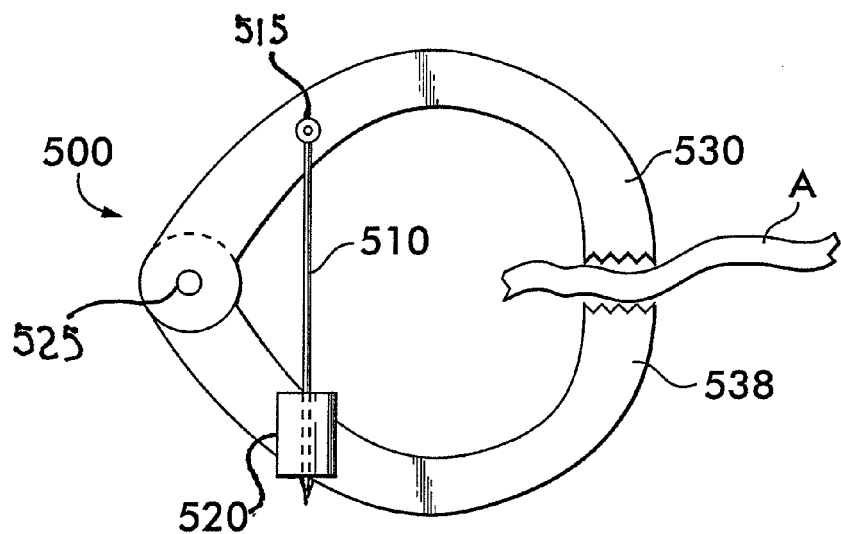
FIG. 5 is a block diagram of an exemplary RF releasable hard tag having a clamping device for attachment to an article.

The tag can be attached to an article by means other than placing a pin through the article. For example, the same pin and ball clutch type locking device as described above can be used to control the arms of a jaw-shaped clamp as depicted in FIG. 5. In an exemplary embodiment, the clamp 500 includes two jaws 530, 538 coupled by a hinge 525. When the clamp 500 is closed over an article A, a pin 510, which is rotatably attached at pivot point 515 to an upper clamp jaw 530 is moved into and is held from retracting by a ball clutch 520, which is rotatably attached to lower jaw 538. The pin 510 is held in the ball clutch 520 as described above, which contains an RF release mechanism as described above, locking the jaws 530 and 538 closed over article A. The ball clutch 520 is released in the same manner as described above, once spring pressure on the balls is released, the jaws 530 and 538 of the clamp can be separated to remove the tag from the article A.

Other means for releasing the RF tag from an article with the application of an RF signal to release circuitry are possible and the invention is not limited to the embodiments described above. For example, instead of a solenoid being used as the electro-mechanical release mechanism, a micro-motor linear actuator can retract a locking pin that holds a clamp or other fixing device closed. Depending on the amount of electrical power available through the RF harvesting circuitry 420, the locking pin can either be a trigger pin that holds back a much stronger force like the spring holding the ball clutch closed as described above and shown in FIG. 4, or the locking pin can be the sole means of holding a clamp closed. Another such embodiment employs a spring-loaded ratcheting mechanism in place of the ball clutch in FIG. 5. As the jaws of the clamp are closed, a spring-loaded ratchet prevents the jaws from opening. Each click of the ratchet allows the jaws to close tighter. The ratchet pawl is released by an electro-mechanical device, e.g. a solenoid, linear actuator or the like, upon reception of a release command.

Another embodiment of the security tag incorporates a locking device, which can be similar to a padlock for securing an item so that it cannot be physically removed, or a reusable safer that encloses the item, such as are commonly used with CDs and DVDs. The locking device operates in the same way as the security tag described above, wherein the device is powered by ambient RF energy, and is released (unlocked) upon receipt of a release signal. The release signal could be from a portable device like a cellular phone or a portable digital assistant with wireless capability or a sales terminal or cash register based transmitter. A detailed disclosure of locking devices that unlock in response to an external signal is contained in U.S. provisional application Ser. No. 60/750,194 filed Dec. 14, 2005, and whose entire disclosure is incorporated by reference herein. Instead of being powered by the release signal as disclosed in that application, the locking devices as described in application 60/750,194 can be powered by an ambient RF harvesting circuit 420 as disclosed herein. In some instances, an RF harvesting circuit is expected to be able to generate and store significantly more energy than the signal receiving circuitry disclosed in that application. Use of an RF harvesting circuit can therefore enhance the locking mechanism such that a more powerful actuator can be used to secure the hardware components of the locking mechanisms as disclosed in application Ser. No. 60/750,194.

While the invention has been described in detail and with reference to specific examples thereof, it will be apparent to one skilled in the art that various changes and modifications can be made therein without departing from the spirit and scope thereof.

What is claimed is:

1. A security tag for attachment to an article comprising:
   a locking mechanism with a release for attaching the tag to the article;
   a resonant circuit or an RFID circuit for responding to wireless signal at a predetermined frequency corresponding to said resonant circuit or to said RFID circuit;
   an ambient RF energy harvesting circuit;
   a release signal detection circuit coupled to and powered by said ambient RF energy harvesting circuit and
   an actuator electrically coupled to said release signal detection circuit, said actuator releasing said locking mechanism whenever said release signal detection circuit receives a release signal.

2. The security tag of claim 1 wherein said actuator is an electro-mechanical actuator.

3. The security tag of claim 2 further comprising a charge storage device, which is a part of said RF energy harvesting circuit.

4. The security tag of claim 3 wherein the electro-mechanical actuator is a solenoid.

5. The security tag of claim 3 wherein the electro-mechanical actuator is a linear actuator.

6. The security tag of claim 3 wherein the RF energy harvesting circuit collects RF energy from a wide band of frequencies.

7. The security tag of claim 3 wherein the RF energy harvesting circuit collects RF energy from a single RF frequency.

8. The security tag of claim 3 wherein the release signal detection circuit responds to an RF release signal.

9. The security tag of claim 8 wherein the RF release signal is modulated and carries data with a unique identifier such that only one security tag will be released upon receipt of the RF signal.

10. The security tag of claim 3 wherein said resonant circuit resonates when in the presence of an RF field at a predetermined frequency.

11. The security tag of claim 10 wherein said predetermined frequency is selected from the group consisting of 8.2 MHz and 13.56 MHz.

12. The security tag of claim 3 wherein said RFID circuit is powered by said wireless signal external to the security tag.

13. The security tag of claim 3 wherein said RFID circuit is powered by said RF energy harvesting circuit.

14. The security tag of claim 13 wherein said RFID circuit transmits a signal having a code that is unique for each security tag.

15. A article security tag comprising:
a locking device for fastening said security tag to an article to be monitored, said locking device incorporating an actuator suitable for unlocking the locking device;
an ambient RF harvesting circuit;
a control circuit, powered by said ambient RF harvesting circuit, and being adapted to receive a wireless signal;
said control circuit being arranged to determine if said wireless signal is appropriate for releasing said locking device, whereupon said control circuit produces a signal causing said electro-mechanical actuator, which is electrically coupled to said control circuit, to unlock the locking device.

16. The article security tag of claim 15 wherein said actuator is an electro-mechanical actuator.

17. A lock system comprising a remote actuating device and a passive lock, said remote actuating device comprising a portable member arranged to wirelessly transmit at least one wireless signal to said lock, said lock comprising an energy storage mechanism, an acuatable trigger mechanism, and a control circuit powered by an ambient RF harvesting circuit, said energy storage mechanism being arranged to store potential mechanical energy therein and to release said energy when triggered by said trigger mechanism, said energy when released enabling said lock to be opened, said control circuit being adapted to receive at least one wireless signal from said portable member, said control circuit also being arranged to determine if said at least one wireless signal is appropriate to unlock said lock, whereupon said control circuit produces a trigger signal, said trigger mechanism being coupled to said control circuit and responsive only to said trigger signal to actuate and enable said potential energy storage mechanism to release said energy to enable said lock to be opened.

18. The lock system of claim 17 wherein said energy storage mechanism is arranged to store potential energy therein upon the closure of said lock.

19. The lock system of claim 17 wherein said trigger mechanism is an electrical to mechanical energy transducer.

20. The lock system of claim 19 wherein the electrical to mechanical energy transducer selected from the group consisting of artificial muscles, piezo electric devices, Hall effect devices, Baker effect devices.

21. The lock system of claim 17 wherein said portable member is selected from the group consisting of cellular phones, portable digital assistants, hand-held and laptop computers.

22. The lock system of claim 17 wherein said energy storage mechanism, said trigger mechanism and said control circuit are all located within a housing, said housing being arranged to enable said wireless signal from said portable device to pass through said housing to said control circuit.

23. The lock system of claim 22 wherein said housing is resistant to physical intrusion.

24. The lock system of claim 17 wherein said wireless signal comprises radio frequency energy including at least one lock related code and wherein said portable member comprises an antenna for wireless transmitting said wireless signal to said lock and wherein said control circuit comprises a RFID circuit.

25. The lock system of claim 24 wherein said radio frequency energy is at approximately 13.56 MHZ.

26. The lock system of claim 24 wherein said portable member is arranged to store therein plural lock related codes and wherein the lock related codes are managed by said portable member.

27. The lock system of claim 17 wherein said system provides data indicating the one or more of who used the lock, where the lock was used, when the lock was used and how the lock was used.

28. The lock system of claim 17 wherein said control circuit includes encryption means.

29. The protection system of claim 17 wherein said portable member is arranged to store therein plural lock related codes and wherein the lock related codes are managed by said portable member.

30. A protection system comprising a lock system and a structure to be protected by a lock, said lock system comprising a remote actuating device and a passive lock, said remote actuating device comprising a portable member arranged to wirelessly transmit at least one wireless signal to said lock, said lock comprising an energy storage mechanism, an actuatable trigger mechanism, and a control circuit powered by an ambient RF harvesting circuit, said energy storage mechanism being arranged to store potential mechanical energy therein and to release said energy when triggered by said trigger mechanism, said energy when released enabling said lock to be opened, said control circuit being adapted to receive said at least one wireless signal from said portable member, said control circuit also being arranged to determine if said wireless signal is appropriate to unlock said lock, whereupon said control circuit produces a trigger signal, said trigger mechanism being coupled to said control circuit and responsive only to said trigger signal to actuate and enable said potential energy storage mechanism to release said energy to enable said lock to be opened.

31. The protection system of claim 30 wherein said lock is arranged to be coupled to said structure, whereupon said lock precludes access to said structure when said lock is closed.

32. The protection system of claim 31 wherein said structure is arranged to hold a product to be sold.

33. The protection system of claim 32 wherein said structure is portable.

34. The protection system of claim 33 wherein said structure is selected from the group comprising hard tags, safers, spiders, boxes, cases, promotional displays, and promotional dispensers.

35. The protection system of claim 32 wherein said structure is static.

36. The protection system of claim 35 wherein said structure is selected from the group comprising rooms, cages, cabinets, drawers, lockers, display fixtures, and dispensing fixtures.

37. The protection system of claim 30 wherein said portable member is selected from the group consisting of cellular phones, portable digital assistants, hand-held and laptop computers.

38. The protection system of claim 30 wherein said portable member is arranged to store therein plural lock related codes and wherein the lock related codes are managed by said portable member.

39. The protection system of claim 38 wherein said trigger mechanism is an electrical to mechanical energy transducer.

40. The protection system of claim 39 wherein the electrical to mechanical energy transducer selected from the group consisting of artificial muscles, piezo electric devices, Hall effect devices, Baker effect devices.

41. The protection system of claim 30 wherein said system provides data indicating one or more factors of who used the lock, where the lock was used, when the lock was used and how the lock was used.

42. A method of protecting a structure by use of a lock system comprising: (A) providing a lock system comprising a remote actuating device and a passive lock, said remote actuating device comprising a portable member arranged to wirelessly transmit at least one wireless signal to said lock, said lock comprising an energy storage mechanism, an actuatable trigger mechanism, and a control circuit powered by an ambient RF harvesting circuit, said energy storage mechanism being arranged to store potential mechanical energy therein and to release said energy when triggered by said trigger mechanism, said energy when released enabling said lock to be opened, said control circuit being adapted to receive said at least one wireless signal from said portable member, said control circuit also being arranged to determine if said wireless signal is appropriate to unlock said lock, whereupon said control circuit produces a trigger signal, said trigger mechanism being coupled to said control circuit and responsive only to said trigger signal to actuate and enable said potential energy storage mechanism to release said energy to enable said lock to be opened; and (B) coupling said lock to said structure.

43. The method of claim 42 wherein said method comprises protecting a product to be sold.

44. The method of claim 43 wherein the product to be sold is protected by a structure.

45. The method of claim 44 wherein said structure is portable.

46. The method of claim 45 wherein said structure is selected from the group comprising hard tags, safers, spiders, boxes, cases, promotional displays, and promotional dispensers.

47. The method of claim 44 wherein said structure is static.

48. The method of claim 47 wherein said structure is selected from the group comprising rooms, cages, cabinets, drawers, lockers, display fixtures, and dispensing fixtures.

49. The method of claim 42 wherein said portable member is selected from the group consisting of cellular phones, portable digital assistants, hand-held and laptop computers.

50. The method of claim 42 wherein said portable member is arranged to store therein plural lock related codes and wherein the lock related codes are managed by said portable member.

51. The method of claim 42 wherein said system provides data indicating one or more factors of who used the lock, where the lock was used, when the lock was used and how the lock was used.

52. The method of claim 42 wherein said trigger mechanism is an electrical to mechanical energy transducer.

53. The method of claim 52 wherein the electrical to mechanical energy transducer selected from the group consisting of artificial muscles, piezo electric devices, Hall effect devices, Baker effect devices.

* * * * *